Patented Nov. 11, 1924.

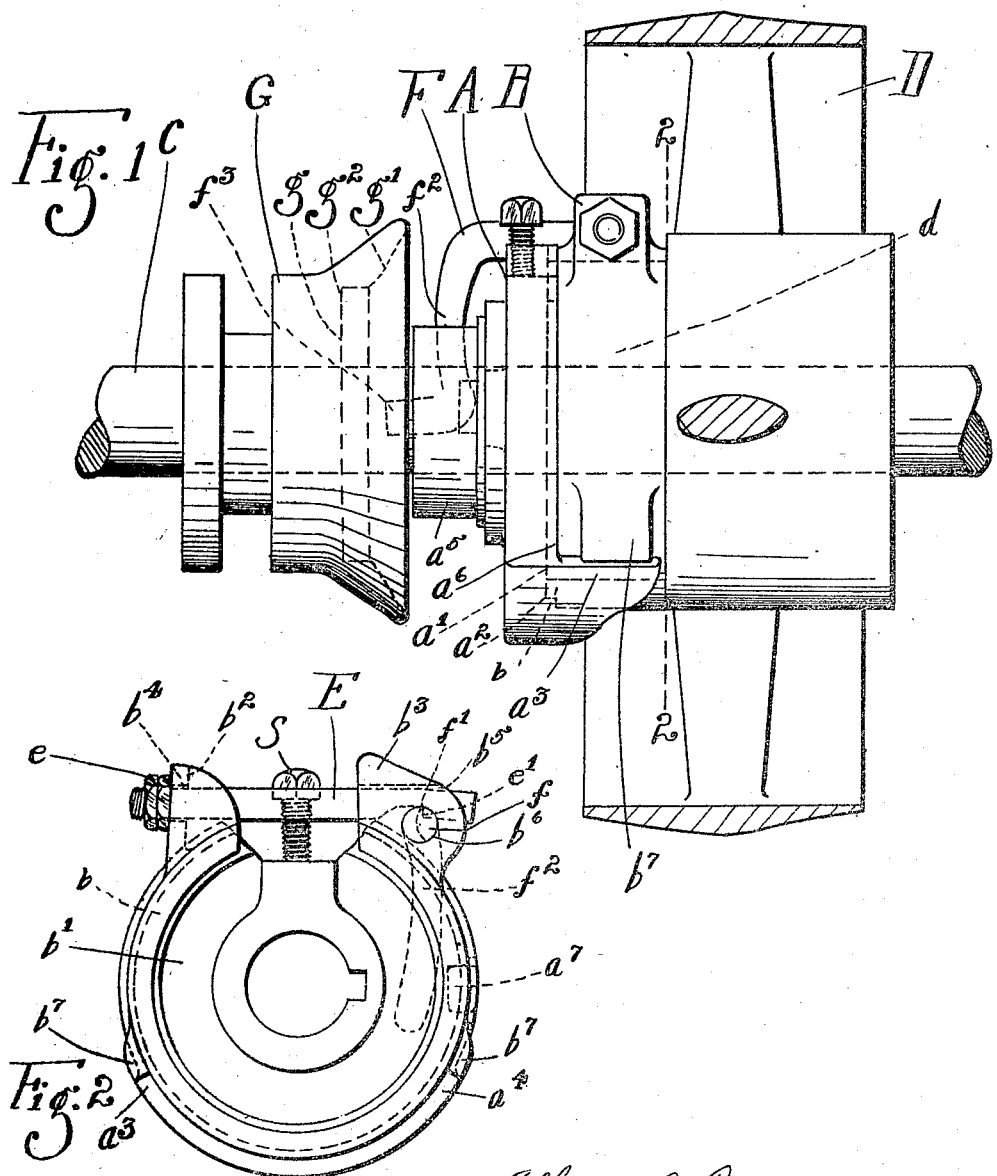

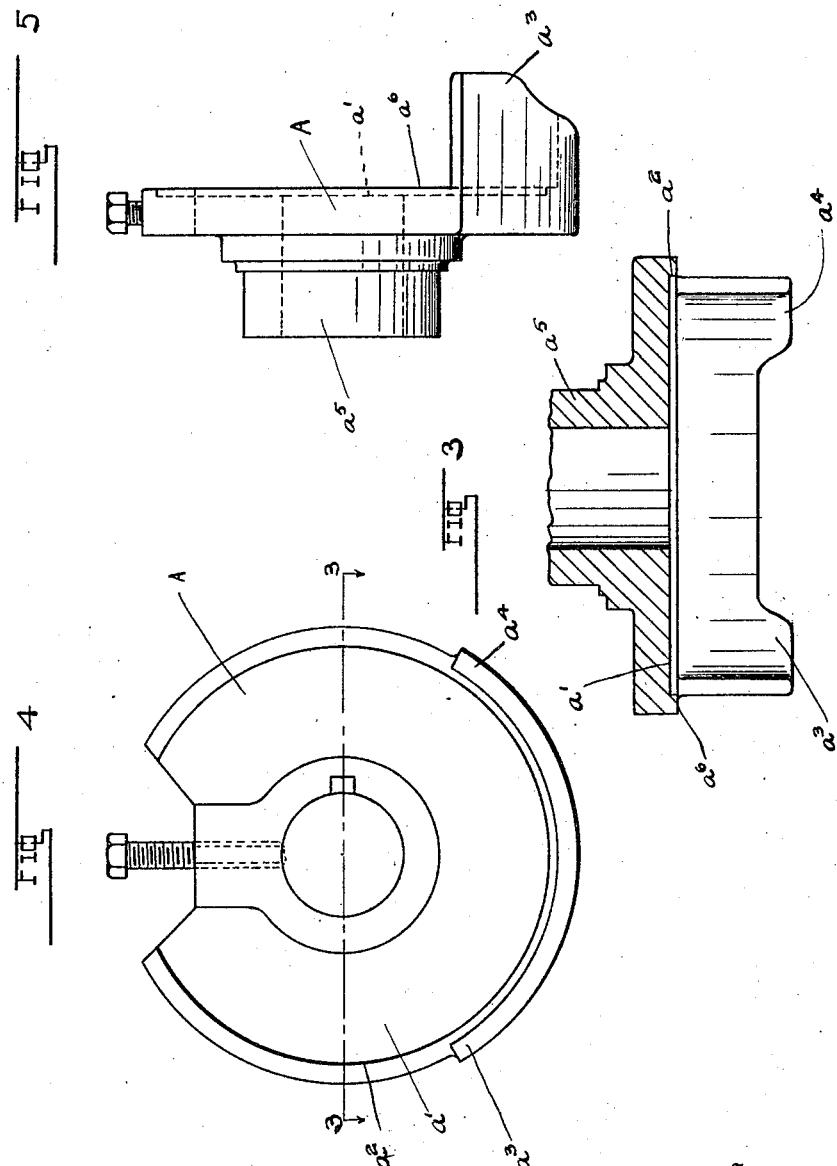

1,515,341

UNITED STATES PATENT OFFICE.

ALFRED A. CONWAY, OF CINCINNATI, OHIO.

HIGH-SPEED CLUTCH.

Application filed April 11, 1921. Serial No. 460,386.

*To all whom it may concern:*

Be it known that I, ALFRED A. CONWAY, a citizen of the United States of America, and resident of Cincinnati, in the county of Hamilton and State of Ohio, have invented a new and useful Improvement in a High-Speed Clutch, of which the following is a specification.

My present invention relates to a clutch of a type similar to that disclosed in my copending application Serial No. 460,385 and filed April 11th, 1921, but in which the mechanisms are especially adapted for use with pulleys and shafts having a high rate of speed, wherefore the clutch is referred to as a high speed clutch.

An object of my invention is to provide a clutch that will operate satisfactorily at a high speed.

Another object is to provide a high speed clutch that will have the desirable self centering and the anti-binding features of my low speed clutch.

These and other objects are attained by the means described herein and disclosed in the accompanying drawings in which:

Fig. 1 is a fragmental elevation of a shaft, pulley and clutch embodying my invention, parts being broken away.

Fig. 2 is a sectional view taken on line 2—2 of Fig. 1, on a slightly reduced scale.

Fig. 3 is a sectional view on line 3—3 of Fig. 4.

Fig. 4 is an end elevation of a carrier plate forming a detail of my invention.

Fig. 5 is a side elevation of a carrier plate forming a detail of my invention.

My invention comprises a carrier plate A mounted on a shaft C, and upon which is mounted a friction band B adapted to engage a hub $d$ of a pulley D revolubly mounted upon the shaft. The friction band is actuated by a lever F and a centripetal cone G operating upon the lever.

The carrier plate A is adapted to support the friction band B. The carrier plate is mounted upon the shaft C and is secured thereon by any suitable means such as a key. The face $a'$ of the carrier plate has extending from it a flange $a^6$, the junction of the flange and the face forming a seat $a^2$ on the carrier plate, the seat being concentric with the shaft C. The lugs $a^3$ and $a^4$ formed on the carrier plate extend beyond the face $a'$ thereof. The hub $a^5$ formed on the carrier plate extends from the side of the plate opposite the face $a'$.

The friction band B has formed upon its one edge a ring guide $b$ adapted to engage the seat $a^2$ formed on the carrier plate A. The band has a central bore $b'$ adapted to extend about the hub $d$ of the pulley D. The clutch or friction band is split and has formed adjacent its ends, the slotted ears $b^2$ and $b^3$, the slots $b^4$ and $b^5$ therein extending transversely to the axis of the central bore $b'$. The primary ear $b^3$ has a bore $b^6$ extending transversely to the perforation $b^5$ therein and in parallelism with the axis of the bore $b'$. The bore $b^6$ at its upper end registers with the bottom of the slot $b^5$. The lugs $b^7$ formed on the friction band engage the lugs $a^3$ and $a^4$ formed on the carrier plate A.

The latch E extends thru the slots $b^4$ and $b^5$, and at the end thereof adjacent the ear $b^2$, it has adjustably mounted upon it the lock nuts $e$. The latch has a shoulder or catch $e'$ formed on its other end, the latch being so positioned that the catch will lie at the intersection of slot $b^5$ and bore $b^6$.

A lever F having a notch $f$ formed therein extends thru the bore $b^6$. The notch serves to form a knife edge $f'$ on the lever, said edge engaging the catch $e'$ of the latch E. The lever F has an arm $f^2$ which extends over the hub $a^5$ on the carrier plate. This arm extends away from the latch E at substantially a right angle thereto; in other words the arm extends across the carrier plate in substantial parallelism with that radius of the bore $b'$ extending between the center of the bore $b'$ and a point substantially midway of the space between the ears $b^2$ and $b^3$. A lug $f^3$ is formed on the arm $f^2$ adjacent the free end thereof.

The centripetal cone G is mounted slidably on the shaft C and is adapted to move longitudinally thereof. The taper face $g'$ formed on the cone G tapers toward the axis of the shaft C and diverges toward the lever F. A seat $g^2$ is formed at the inner or centermost portion of the taper face $g'$. The seat $g^2$ on the centripetal cone is adapted to accommodate the lug $f^3$ formed on the lever F.

The operation of my device is as follows:

We will assume that the pulley D is normally stationary and that the shaft C is being revolved at a high rate of speed, the rate of speed tending to throw that end of the lever F upon which is formed the lug $f^3$ beyond the body line of the carrier plate. This tendency serves to hold the lug $f^3$ in engagement with the outermost portion of the taper face $g'$ on the centripetal cone G. In this normal position, the ears $b^2$ and $b^3$ tend to separate. When in this expanded position, the ring guide formed on the friction band engages the concentric seat $a^2$ formed on the carrier plate A, whereby the friction band is centered in relation to the shaft C, and the hub $d$ of the pulley D. The pulley D is loosely mounted on the shaft. When it is desired to transmit motion from the shaft C to the pulley D, the cone G is moved toward and over the hub $a^5$ by any suitable means such as a hand lever common in the art and which therefore is not shown. The movement of the cone G toward the carrier plate serves to move the lug $f^3$ on the lever F centerward over the taper face $g'$. The movement of the lever arm causes rotation of the lever arm in the bore $b^6$ so that the knife edge $f'$ engaging the catch $e'$ of the latch E draws the ears $b^2$ and $b^3$ together, whereby the friction band clamps upon the hub $d$ of the pulley D. After the lug $f^3$ has moved over the centermost portion of the taper face $g'$, the lug engages in the seat $g^2$ formed on the cone G, which engagement serves to retain the parts in driving relation. The engagement of the lugs $a^3$ and $a^4$ with the lugs $b^7$ causes the carrier plate and friction band to rotate in unison and to transmit motion from the shaft to the pulley. When the cone is disengaged from the lever F, the tension upon the friction band is released, the ears $b^2$ and $b^3$ move apart thereby releasing the hub $d$ of the pulley D and moving the lug $f^3$ of the lever arm outwardly over the taper face $g'$. When the friction band is disengaged from the hub $d$ the ring guide $b$ engages the seat $a^2$ on the carrier plate thereby centering the friction band. The centrifugal force developed by the rotation of the clutch tends to throw the lever arm outward from the hub. The centripetal cone counteracts this tendency A suitable stop such as lug $a^7$ may be formed on the plate to limit the outward movement of the lever arm when disengaged from the cone. The set screw S secures the carrier plate upon the shaft and precludes displacement of the carrier plate longitudinally of the shaft C.

What I claim is:

In a high speed clutch mechanism the combination of a shaft, a hub mounted revolubly on the shaft, a carrier plate mounted fixedly on the shaft, a split friction band normally disengaged from the hub and adapted to be moved into frictional driving contact therewith, a slotted ear on one end of the friction band having a bore transverse to the slot therein registering at its top with the bottom of the slot, a latch mounted on the other end of the friction band and extending into the slot in the ear, a lever rotatably mounted in the bore and engaging the latch, an arm on the lever, the arm and latch diverging toward the shaft so that the shaft assumes a position intermediate the arm and latch, a cone slidably mounted on the shaft adapted to engage the arm and to move the arm toward the shaft whereby the lever is rotatably actuated in the bore and the latch is actuated to move the band into frictional driving contact with the hub, and means to impart movement of the carrier plate to the friction band.

In testimony whereof, I have hereunto subscribed my name this 20th day of March, 1921.

ALFRED A. CONWAY.